United States Patent
Doudement et al.

(10) Patent No.: US 10,351,352 B2
(45) Date of Patent: Jul. 16, 2019

(54) METHOD FOR ALIGNING AND RIGHTING PREFORMS BY MEANS OF CENTRIFUGATION, AND ASSOCIATED DEVICE

(71) Applicant: SIDEL PARTICIPATIONS, Octeville-sur-mer (FR)

(72) Inventors: Denis Doudement, Octeville-sur-mer (FR); Anthony Debris, Octeville-sur-mer (FR); Frederic Willig, Octeville-sur-mer (FR); Eric Mazo, Octeville-sur-mer (FR)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 0 days.

(21) Appl. No.: 15/564,097

(22) PCT Filed: Apr. 12, 2016

(86) PCT No.: PCT/FR2016/050834
§ 371 (c)(1),
(2) Date: Oct. 3, 2017

(87) PCT Pub. No.: WO2016/166459
PCT Pub. Date: Oct. 20, 2016

(65) Prior Publication Data
US 2018/0086570 A1    Mar. 29, 2018

(30) Foreign Application Priority Data

Apr. 16, 2015 (FR) ..................... 15 53372

(51) Int. Cl.
*B65G 47/14* (2006.01)
*B29C 49/42* (2006.01)
*B65G 47/256* (2006.01)

(52) U.S. Cl.
CPC .......... *B65G 47/1464* (2013.01); *B29C 49/42* (2013.01); *B29C 49/4205* (2013.01);
(Continued)

(58) Field of Classification Search
CPC ................ B65G 29/00; B65G 47/1457; B65G 47/1464; B65G 47/256; B65G 2201/0235;
(Continued)

(56) References Cited

U.S. PATENT DOCUMENTS 4,401,203 A * 8/1983 McDonald ......... B65G 47/1457
198/392
6,190,094 B1 * 2/2001 Rediess ................ B65G 51/035
406/19

(Continued)

FOREIGN PATENT DOCUMENTS

DE    10 2005 048 126 A1    4/2007
DE    60 2004 001 132 T2    5/2007
(Continued)

OTHER PUBLICATIONS

International Search Report, dated Jul. 28, 2016, from corresponding PCT application No. PCT/FR2016/050834.

*Primary Examiner* — Gene O Crawford
*Assistant Examiner* — Keith R Campbell
(74) *Attorney, Agent, or Firm* — Young & Thompson (57) ABSTRACT

A device and method for aligning preforms in a row and righting same, the method being intended for use with axisymmetric preforms having an annular supporting face. The method includes a first step of discharging the preforms in bulk onto a rotating horizontal platen; a second step of aligning the preforms against a fixed peripheral rail by way of the centrifugal force produced by the rotation of the rotating platen; a third step of successively righting the aligned preforms by tilting the preform bodies, performed under the annular supporting face. During the second alignment step, the main axis of the preforms is oriented essentially tangentially to the direction of movement.

18 Claims, 4 Drawing Sheets

(52) U.S. Cl.
CPC .... *B29C 2049/4231* (2013.01); *B65G 47/256* (2013.01); *B65G 2201/0244* (2013.01)

(58) Field of Classification Search
CPC ........ B65G 2201/0244; B29C 49/4205; B29C 2049/4231; B29C 49/42
USPC .................. 198/392, 396, 408, 550.01, 550.3
See application file for complete search history.

(56) References Cited

U.S. PATENT DOCUMENTS 8,985,308 B2    3/2015  Stoiber et al.
9,561,614 B2    2/2017  Novak

FOREIGN PATENT DOCUMENTS

| DE | 10 2011 050 843 | A1 |   | 12/2012 |            |
|----|-----------------|----|---|---------|------------|
| EP | 1 690 813       | A1 |   | 8/2006  |            |
| EP | 1690813         | A1 | * | 8/2006  | ............. B65G 17/24 |
| EP | 2 048 097       | A1 |   | 4/2009  |            |
| WO | 2004/069700     | A1 |   | 8/2004  |            |

\* cited by examiner

METHOD FOR ALIGNING AND RIGHTING PREFORMS BY MEANS OF CENTRIFUGATION, AND ASSOCIATED DEVICE

TECHNICAL FIELD OF THE INVENTION

The invention relates to a method for aligning in a row and righting preforms, in particular preforms made of thermoplastic material intended to be shaped into a final container by a forming station, with the method being intended to be applied to axisymmetrical preforms having annular support faces and bodies with a diameter that is smaller than the diameter of said support face, with the method comprising:

A first step for discharging preforms in bulk onto a rotating horizontal platen;

A second step for aligning preforms against a stationary peripheral railing by the centrifugal force that is produced by the rotation of the rotating platen, with the preforms being driven in movement by the rotating platen along said railing against which they are held by the centrifugal force, with each preform aligned against the guide railing having a main axis that is oriented essentially horizontally;

A third step for successive righting of the preforms that are aligned by tilting the body of each preform under its annular support face until its main axis is vertical, with each preform being supported by its support face between two opposite support points.

The invention also relates to a device for aligning in a row and righting preforms, with the device being intended to be applied to axisymmetrical preforms having annular support faces and bodies with a diameter that is smaller than the diameter of said support face, the device having a centrifuge bowl that comprises:

A horizontal circular platen that rotates around a vertical axis;

A stationary peripheral railing to hold the preforms thrown off by the centrifugal force;

A spillway of preforms that discharges the preforms in bulk onto the platen that rotates in the direction of a first portion for receiving the railing;

Means for righting said preforms.

TECHNICAL BACKGROUND OF THE INVENTION

The method and the associated device are intended to be used in an installation for manufacturing containers made of thermoplastic material and in particular polyethylene terephthalate (PET) by forming, in particular by blow molding or stretch blow molding, preforms. Such an installation makes it possible to produce containers on a very large scale at very high rates, for example greater than 85,000 bottles per hour.

According to a well-known technique, such containers are produced in two main steps. In a first step, molding is initiated by injection of a preform made of PET. This preform comprises an essentially tubular body that is closed at one of its axial ends, the opposite end being open by means of a neck. The neck has, right from this injection-molding operation, the definitive shape of the neck of the container. Generally, the neck of the container comprises a threading.

The preform generally comprises an annular support face that projects radially toward the outside relative to the rest of the body and that is oriented axially toward the closed end of the body. Such a support face is carried by, for example, an annular support collar that extends radially projecting toward the outside relative to the rest of the preform and that is arranged at the base of the neck.

There are installations in which the preforms, once injected, are directly passed on to the forming station, with each preform being transported individually.

However, in numerous cases, the preforms are manufactured by injection at a first location and are molded by blow molding to the definitive shape of the container at a second location in a specific manufacturing installation. Such a technology makes it possible to initiate the molding operation by blow molding as close as possible to the bottling site, with the injection operation able to be carried out at any location. Actually, it is relatively easy and inexpensive to transport preforms of reduced size, while transporting containers after blow molding has the drawback of being economically inefficient because of their very significant volume.

In the case where the injection station and the installation for manufacturing by forming are two totally independent machines, the preforms are generally delivered in bulk. The blow-molding station therefore uses a device for feeding preforms that is equipped with a device for aligning in a row and righting preforms. This invention relates to such a device.

According to a first device for aligning and righting preforms that is known from the state of the art, the preforms are discharged in bulk into a container. They are removed from this container by a lifting belt that in turn discharges the preforms at a preset pace at the upper end of the orienting rollers, also called aligning rollers. These two aligning rollers are inclined relative to the horizontal, and they are essentially parallel to one another. The two rollers are driven in rotation in opposite directions and are separated from one another in such a way as to allow an interval to exist that is of a slightly larger size than the size of the bodies of the preforms. The separation of the two aligning rollers is such that the transverse space between the two rollers is smaller than the size of the support collar located at the base of the neck.

The orienting rollers are configured in such a way that under the effect of gravity, the preforms are placed between the two rollers. Thus, by simple gravity, each preform tends to be placed between the two rollers, in such a way as to be supported by its collar on the rollers with its body hanging downward between the two rollers. The opposite rotating movement of the two rollers and their incline ensures, on the one hand, the alignment in a row of the righted reforms and, on the other hand, the sliding of the preforms toward the bottom of the orienting rollers where they are then recovered in a feed slide, itself connected to the blow-molding installation.

The thus aligned and righted preforms are accumulated in the feed slide that generally feeds a heating furnace to put the preforms at a suitable temperature for being formed.

Such a feed device offers the advantage of being able to align and right the preforms at a pace that is compatible with the pace of the manufacturing installation.

However, this known device is very bulky both horizontally and vertically. Actually, to ensure the effective righting of preforms, the rollers generally have a great length. Furthermore, such devices can measure more than 5 m in height.

A less bulky aligning and righting device comprising a centrifuge bowl was already proposed. The preforms are thrown in bulk onto a rotating platen that forms the bottom of the bowl. The preforms are then thrown off by the centrifugal force against a peripheral railing. A vertical space reserved between the railing and the rotating platen makes possible the passage of the bodies of the preforms while holding them by their collars. Under the effect of the centrifugal force, the preforms are thus aligned on the periphery of the bowl, with their main axis placed in an orientation that is essentially radial relative to the center of the bowl. The preforms thus have an axis that extends essentially orthogonally both in the direction of the gravity and the direction of movement of the preforms.

The thus aligned and oriented preforms are then guided toward a tangential outlet of the bowl under the effect of the movement of rotation of the rotating platen.

Before they exit or after they exit, the preforms are righted in such a way that their main axis is oriented vertically so that they can be picked up by a travel slide, generally horizontal, along which they are no longer subjected to the centrifugal force.

The preforms are supported by their collars that rest on two diametrically opposite support points. These two support points are aligned orthogonally in the direction of movement of the preforms.

As result, the tilting of the preforms causes them to oscillate by rolling between the two rails of the slide. However, with the main axis of each preform tilting in the same plane as the support points, preforms run the risk of no longer being guided by only one support point, and even of jumping out of contact with the rails. Such a movement, if it is not controlled, runs the risk of causing a sliding of these preforms that, at best, will fall from the slide, or, at worst, will be blocked by stopping the travel of the subsequent preforms. Such a blocking is likely to cause the temporary shutdown of the entire manufacturing installation.

The righting of preforms requires the presence of guides for bodies of complex shape and adapted to the morphology of each preform model to make possible a permanent and stable guiding of each preform during the righting. Such guide parts are complex and cumbersome to produce.

In addition, when the manufacturing installation is intended to be used with various preform models based on the containers to be obtained, it is necessary to use guide parts that are adapted for each of the models that can be used. The cost of the device is increased.

Moreover, the guide-part change operations that take place during each change in preform model are long and tedious. The extended down time of the device due to this change is expensive for the manufacturer.

BRIEF SUMMARY OF THE INVENTION

The invention proposes a method of the type described above, characterized in that during the second aligning step, the main axis of the preforms is oriented essentially tangentially to their direction of movement up to their righting.

According to another characteristic of the method, the righted preforms are driven in rotation around their main axis by friction against an outer edge of the rotating platen, with the preforms thus being moved around the bowl in the direction of rotation of the rotating platen, by rolling against the peripheral railing.

The invention also proposes a device of the type described above for implementing the method carried out according to the teachings of the invention, characterized in that in a first established angular sector of the bowl including the receiving portion, the railing is placed close to the platen in such a way that it can hold the bodies of the preforms on the rotating platen and inside the bowl against the centrifugal force that is produced by the rotation of the rotating platen.

According to other characteristics of the device:

At least on the periphery of the first established sector of the bowl, the railing extends vertically above the rotating platen;

On a second angular sector of the bowl, arranged downstream from the first angular sector in the direction of rotation of the rotating platen, the bowl has a peripheral gap formed by radial separation of the railing relative to the outer edge of the rotating platen, with said gap having a radial width whose value is between the diameter of the body and the diameter of the support face to make possible the tilting of the bodies of the preforms below the area of the rotating platen through said gap, with the support face being intended to be supported jointly by the rotating platen and by the railing;

The railing has a support rail for the support face that extends at least on the second angular sector of the bowl, with the rail extending in the same area as the rotating platen to delimit the gap on the outside;

The outer edge of the rotating platen and/or the railing comprise(s) a tread that has a friction coefficient that can allow the preform to roll against the tread without sliding;

The device comprises a conveyor that is connected tangentially to the rotating platen with an exit passage of the righted preforms that is open in the railing downstream from the second established sector;

The conveyor is formed by a horizontal slide that is formed by an outer rail that extends the rail of the railing and a parallel inner rail that tangentially extends the outer edge of the rotating platen, with the rails being separated in such a way as to support a righted preform on its support face;

The righted preforms that are transferred to the conveyor are moved by a blower device.

BRIEF DESCRIPTION OF THE FIGURES

Other characteristics and advantages of the invention will emerge during the reading of the detailed description that follows for the understanding of which reference will be made to the accompanying drawings in which.

DETAILED DESCRIPTION OF THE FIGURES

Hereinafter, elements that have an identical structure or analogous functions will be referred to by the same references.

Hereinafter, the following local orientations will be adopted in a non-limiting manner for each preform that is present in the centrifuge bowl of the device:

Radial "R" directed from the inside to the outside from the axis of rotation of the rotating platen;

Tangential "T" that is orthogonal to the radial direction "R" and that extends in the plane of the rotating platen, directed from upstream to downstream in the direction of rotation of the rotating platen;

Vertical "V" directed from bottom to top in the reverse direction of Earth's gravity.

Figure 1:
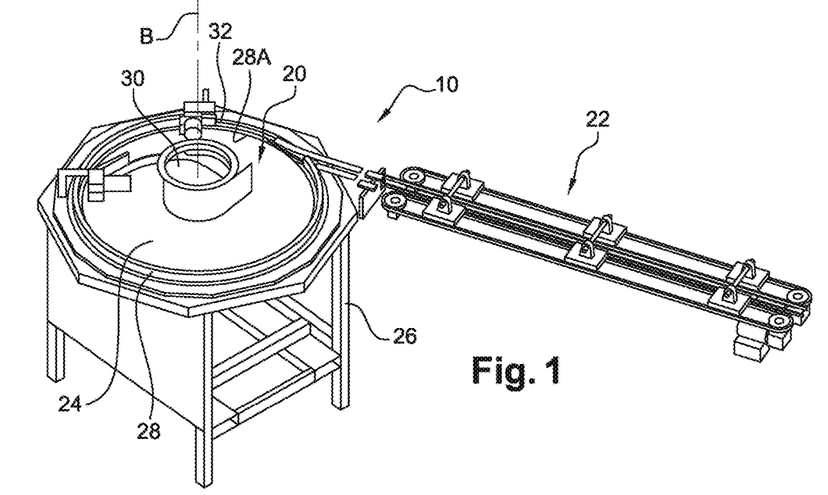
FIG. 1 is a perspective view that diagrammatically shows a device for aligning and righting preforms comprising a centrifuge bowl in accordance with the teachings of the invention.

A device 10 for aligning in a row and righting preforms 12 intended to be part of an installation (not shown) for manufacturing containers made of thermoplastic material by forming, in particular by blow molding or by stretch blow molding, was shown in FIG. 1.

Figures 2, 3:
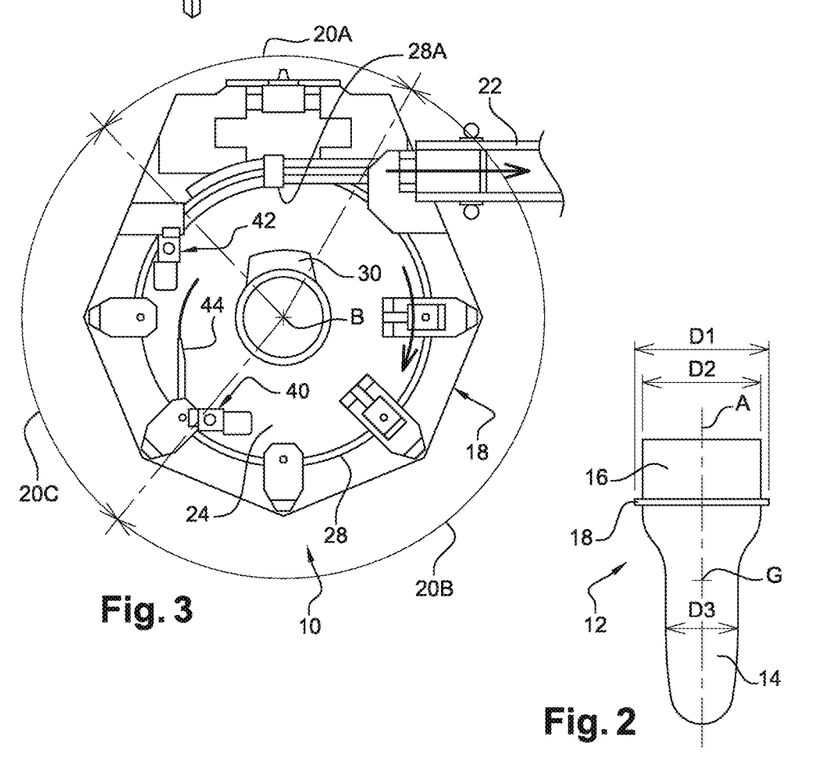
FIG. 2 is a front view that shows a preform that is suitable for being used with the device of FIG. 1, with the axis of the preform being oriented vertically here.
FIG. 3 is a top view that shows the centrifuge bowl of FIG. 1.

An example of the preform 12 that is intended to be used with the device 10 is illustrated in FIG. 2. Such a preform 12 is made of thermoplastic material, here made of PET. It is conventionally obtained by injection molding. It has an essentially axisymmetrical shape around a main axis "A" shown vertically in FIG. 2.

It comprises a body 14 in the shape of an elongated tube along a main axis "A," which has a first closed axial end and a second end, opposite, shown at the top in FIG. 2, with an axially-open neck 16.

The preform 12 also comprises an annular support face 18 that is oriented axially toward the closed end of the preform 12. This annular support face 18 projects radially relative to the rest of the body 14 and is arranged above a center "G" of gravity of the preform 12. The term "annular" means that the support face goes around the preform 12 either in a continuous manner or in an intermittent manner. In the latter case, the annular face is formed by, for example, separate segments that go around the preform, but that are nevertheless close enough so that the preform can be supported between two diametrically opposite supports regardless of its position around its main axis.

In the example shown, the base of the neck 16, at the junction with the body 14, has a collar that extends radially projecting relative to the rest of the preform 12. The lower face of the collar thus forms said support face 18.

As a variant, the collar can be arranged other than at the base of the neck, for example in the area of the rim.

According to another variant, the support face is formed by a lower face of a threading of the neck.

According to still another variant, the support face is connected to the preform, for example by means of a stopper.

The outer diameter "D1" of the support face 18, in this case of the collar, is thus larger than the maximum outer diameter "D2" of the body 14. In the example shown in FIG. 2, the closed end segment of the body 14 has here a minimum outer diameter "D3."

The neck 16 has its definitive shape, while the body 14 is intended to be stretched radially (by blow molding) and axially during a subsequent forming operation to form the body of the finished container.

In addition, the weight of the bodies 14 of the preforms 12 that are used is greater than the weight of their necks 16, including that of the collars. Thus, the center "G" of gravity of the preform 12 is located under the support face 18 with reference to FIG. 2. In this way, a preform 12 that is supported by its support face 18 resting on two diametrically opposite supports will be naturally oriented by gravity with the neck 16 at the top.

The example shown in FIG. 2 is non-limiting. It will be understood that the device 10 and the associated method are intended to be applied to all types of preforms 12 that have a support face 18, radially projecting relative to the rest of the body 14, and that have a center of gravity that is axially offset toward the body relative to said support face 18.

Returning to FIG. 1, the device 10 comprises primarily a centrifuge bowl 20 as well as a conveyor 22 for discharging aligned and righted preforms.

Figure 4:
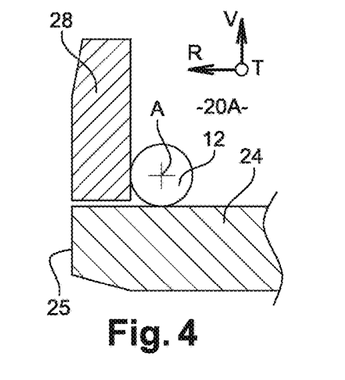
FIG. 4 is a radial cutaway view of an aligning sector of the centrifuge bowl of FIG. 1, which shows the peripheral railing and the rotating platen of the centrifuge bowl as well as an aligned preform.

The centrifuge bowl 20 comprises a horizontal circular platen 24 that rotates around a central vertical axis "B." The rotating platen 24 thus has a circular outer edge 25 shown in FIG. 4. The upper face of the rotating platen 24 vertically delimits downward the inside of the centrifuge bowl 20. Thus, the platen 24 forms the bottom of the bowl 20.

The rotating platen 24 has an outer diameter that is much larger than the dimensions of the preforms 12.

The rotating platen 24 is driven in rotation at a constant speed, here in a clockwise direction in a top view, for example by a motor (not shown) that is arranged below the rotating platen 24. The speed of rotation is, for example, controlled in such a way that the outer edge 25 of the rotating platen 24 moves between 2 and 3 m/s.

The rotating platen 24 is carried here by a support table 26. The support table 26 has feet that are advantageously adjustable in height to make it possible to adjust the plate of the rotating platen 24.

The centrifuge bowl 20 is delimited radially toward the outside by a stationary peripheral railing 28, which is attached here to the support table 26. The first function of this railing 28 is in particular to hold the preforms thrown off toward the outside by the centrifugal force that is produced by the rotation of the rotating platen 24, while its second function is to guide the movement of the preforms 12 to an exit passage 32 of the bowl 20.

The preforms 12 are intended to be discharged in bulk onto the rotating platen 24 by means of a stationary spillway 30. The spillway 30 is arranged here in the center of the rotating platen 24. The spillway 30 is designed to discharge the preforms 12 in bulk, radially in the direction of a first portion 28A for receiving the railing 28. The spillway 30 here comes in the form of a toboggan fed by preforms 12 at the top, by means of a lifting belt (not shown). The top of the spillway 30 nevertheless has a relatively small height; it is, for example approximately 40 cm above the platen 24.

As is illustrated in FIG. 3, for the requirements of the description, the bowl will be divided into three stationary zones relative to the table 26, each formed by an angular sector that extends around the axis "B" of the rotating platen 24.

A first angular sector 20A, a so-called preform aligning sector 12, extends facing the outlet of the spillway 30. This angular aligning sector 20A includes the portion 28A for receiving the railing 28.

A second angular sector 20B, for righting aligned preforms 12, is arranged directly downstream from the first angular aligning sector 20A. In a non-limiting manner, it extends overall to 180° here.

A third angular sector 20C, for sorting incorrectly-aligned preforms, is arranged directly downstream from the second angular righting sector 20B and directly upstream from the first angular aligning sector 20A. At the downstream end of this sorting sector 20C, the exit passage 32 of the preforms 12 is open in the railing 28 to make it possible to guide the correctly-aligned and righted preforms 12 to the conveyor 22. The conveyor 22 passes here behind the portion 28A for receiving the railing 28.

The name of each of these sectors 20A, 20B, 20C provides an indication of their function. It will be understood by the following that non-aligned preforms 12 in the area of the first angular sector 20A can nevertheless be aligned and righted in the area of the second angular sector 20B depending on the circumstances.

Over the entire periphery of the first angular aligning sector 20A, operational play is reserved between the railing 28 and the rotating platen 24. This play makes possible the rotation of the rotating platen 24, but it is, however, slight enough to keep the entire body of the preform 12 inside the bowl 20. This play is thus less than the minimum diameter "D3" of the body 14 of the preform 12.

As shown in FIG. 4, in this aligning sector 20A, the railing 28 extends vertically above the rotating platen 24 in such a way that the outer edge 25 of the rotating platen 24 is arranged outside of the centrifuge bowl 20.

Figure 5:
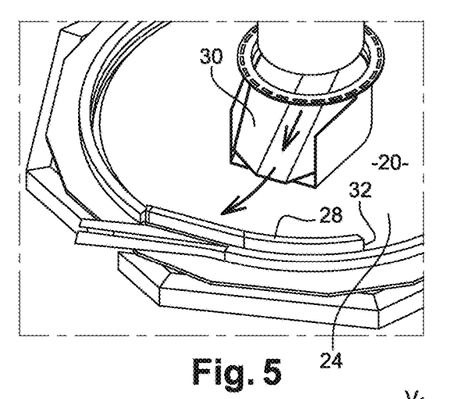
FIG. 5 is a perspective view that shows a spillway of the device of FIG. 1.
Figure 6:
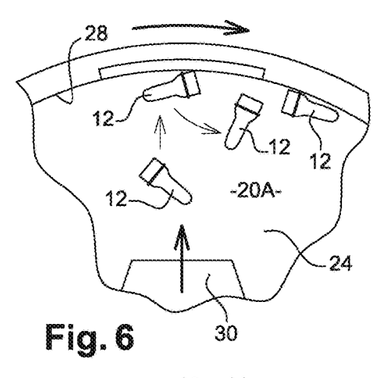
FIG. 6 is a top view that shows a portion of the aligning sector of the centrifuge bowl, as well as the various steps in the travel of a preform discharged into the centrifuge bowl.

During the operation of the device 10, as shown in FIGS. 5 and 6, during a first step of discharges, the preforms 12 that are discharged in bulk via the spillway 30 are thrown off radially against a portion 28A for receiving the railing 28, under the combined effect of their radial sliding speed at the exit of the spillway 30 and the centrifugal force that is produced by the rotation of the rotating platen 24. At the same time, the rotating platen 24 also begins to drive in its rotation the preforms 12 tangentially downstream.

During a second aligning step, the preforms 12 are held in the inside of the bowl 20 by the railing 28, and then, after one or more rebounds against the railing 28, the preforms 12 gradually lose speed in the radial direction. They are then constantly held radially against the railing by the centrifugal force. FIG. 6 shows the path followed by the same preform 12 from its arrival via the spillway 30 to its stable position against the railing 28. From this stable position, the preforms 12 are driven in purely tangential movement in a clockwise direction by the rotating platen 24 along the railing 28.

In this configuration, the preforms 12 naturally occupy the most stable position in which their main axis "A" is oriented in a tangent direction relative to the rotating platen 24.

Most of the preforms 12 that are present in the angular aligning sector 20A of the bowl 20 are thus aligned tangentially against the railing 28, with their main axis "A" being oriented essentially tangentially to their direction of movement. The tangential separation between two successive aligned preforms 12 is random, because the rotating platen 24 is perfectly flat and does not have indexing notches of the preforms 12. The preforms 12 can thus be in contact by their ends under the effect of the centrifugal force that makes it necessary for the preforms 12 to slide relative to one another. The preforms 12 thus occupy in an optimal manner the entire peripheral length of the bowl 20.

At this stage, the preforms 12 are oriented randomly with their necks upstream or downstream, with no impact on the rest of the method. The thus aligned preforms 12 continue their peripheral movement in the righting sector 20B.

The fact that the preforms 12 are held on the rotating platen 24 makes it possible to keep them flattened radially against the railing 28. Thus, the preforms 12 are guided in a stable manner by the railing 28 during their movement around the bowl 20.

Figure 7:
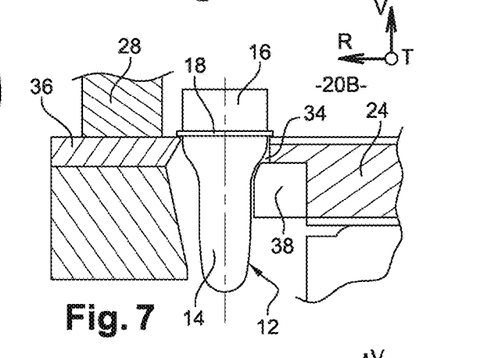
FIG. 7 is a radial cutaway view of a righting sector of the centrifuge bowl of FIG. 1, which shows the peripheral railing and the rotating platen of the centrifuge bowl as well as an aligned and righted preform.

As shown in FIG. 7, in the second angular righting sector 20B of the centrifuge bowl 20, the bowl 20 comprises means for righting preforms 12. The righting means comprise a peripheral gap 34 that is formed by radial separation of the railing 28 relative to the outer edge 25 of the rotating platen 24. The radial width of the gap 34 is between the maximum diameter "D2" of the body 14 and the diameter "D1" of the support face 18, in this case of the collar. This gap 34 extends to the exit passage 32 of the preforms 12.

At least along the second righting sector 20B, the railing 28 has a support rail 36 of the support face 18. The rail 36 extends radially projecting toward the inside in the same area as the upper face of the rotating platen 24 to delimit the gap 34 toward the outside. The rail 36 extends here to the exit passage 32.

Thus, the preforms 12 are able to be supported by their support faces 18, in this case by their collars, which rest on two diametrically opposite points on the horizontal upper face of the rotating platen 24, on the one hand, and on a horizontal upper face of the rail 36, on the other hand, with the bodies 14 of the preforms 12 hanging under the area of the rotating platen 24 through said gap 34. The two support points are aligned radially. The rail 36 makes it possible to support the preforms 12 in a stable manner.

Figure 8:
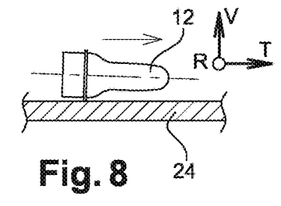
FIG. 8 is a diagrammatic view in a radial direction, which shows a preform that is aligned along the railing in the aligning sector of the centrifuge bowl of FIG. 1.
Figure 9:
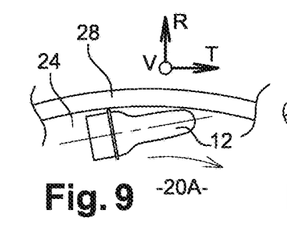
FIG. 9 is a top view of FIG. 8.

Thus, during a third so-called righting step, as shown in FIGS. 8 and 9, the preforms 12 that are aligned during the second step arrive from the first aligning sector 20A by being aligned in a row along the railing 28, with their main axis "A" oriented tangentially. The aligned preforms 12 are placed randomly with neck 16 upstream or neck 16 downstream without this having an influence on their righting.

Figure 10:
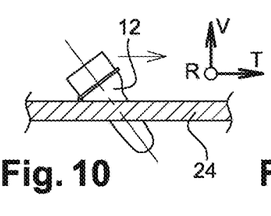
FIG. 10 is a view that is similar to the one of FIG. 8 that shows the preform of FIG. 8 during righting at the beginning of the righting sector of the centrifuge bowl of FIG. 1.
Figure 11:
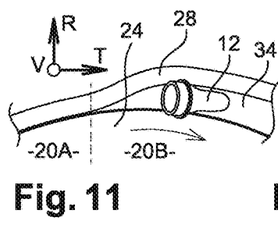
FIG. 11 is a top view of FIG. 10.
Figure 12:
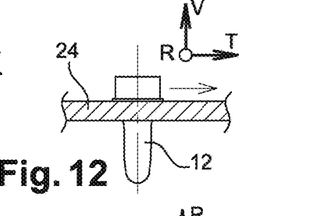
FIG. 12 is a view that is similar to the one of FIG. 10 that shows the preform of FIG. 10 righted in the righting sector of the centrifuge bowl of FIG. 1.
Figure 13:
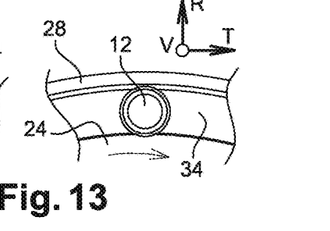
FIG. 13 is a top view of FIG. 12.

When the body 14 of each preform 12 arrives above the gap 34, the body 14 begins to fall, as shown in FIGS. 10 and 11, thus making the preform 12 tilt around a radial axis that passes through the support points of the support face 18, in this case of the collar, of the preform. The tilting continues until the main axis "A" of the preform 12 is vertical, optionally after some balancing around the radial axis. The preform 12 is then supported by its support face 18 resting jointly on the rail 36 and on the rotating platen 24, as indicated in FIGS. 12 and 13. The preform 12 is then righted, the neck 16 at the top. The preform 12 is thus guided, on the outside, by the rail 36 of the railing 28, and it is guided, on the inside, by the peripheral edge 25 of the rotating platen 24.

During the tilting, the main axis "A" of the preform 12 remains in a vertical plane that is tangent to the movement. Because of the tilting of the main axis "A" in the direction of movement of the preforms 12, the support face 18 of each preform 12 remains in permanent contact with the rotating platen 24, on the one hand, and with the rail 36, on the other hand, by its two support points. Thus, each preform 12 is guided in a stable and effective manner during its righting.

As shown in FIG. 11, a transition zone is provided at the end upstream from the angular righting sector 20B. In this transition zone, the width of the gap 34 gradually changes until its final width is reached. To do this, the railing 28 gradually moves away radially from the axis "B" of rotation of the rotating platen 24. This makes it possible for the aligned preforms 12 to remain constantly in contact with the railing 28 under the effect of the centrifugal force. The preforms 12 are thus guided in the aligned position in a stable manner even during their righting.

If there were a gap in the railing 28, it could no longer perform its role as a guide in the area of this gap. The correctly-aligned preforms 12 would then run the risk of bouncing off and of winding up poorly positioned, leaning, for example, against the adjacent preforms and then preventing the righting of the latter.

The thus righted preforms 12 are driven in rotation around their main axis by friction against the outer edge 25 of the peripheral platen 24. The preforms 12 are thus moved around the bowl 20 in the direction of rotation of the rotating platen 24 by rolling against the peripheral railing 28.

To improve this rolling phenomenon of the preforms 12 and thus to increase their speed of advance 12 around the platen 24, the outer edge 25 of the rotating platen 24 advantageously comprises a tread 38 that has a suitable friction coefficient for allowing the bodies 14 of the preforms 12 to roll against the tread 38 without sliding. Such an arrangement is shown in, for example, FIG. 7.

As a variant of the invention that is not shown and that can replace the arrangement of FIG. 7 or be combined with this same arrangement, the railing is equipped with a similar tread that is intended to come into contact with the bodies of righted preforms.

The righted and aligned preforms 12 are thus directed toward the third sorting sector 20C, in which the poorly-aligned preforms 12N are sent back directly toward the first aligning sector 20A by various sorting means, such as separator wheels 40, 42 and a deflector 44.

The sorting means make it possible to actively eject incorrectly-aligned preforms 12N toward the angular aligning sector 20A so as to make possible their direct return into the flow of preforms that are arriving in bulk via the spillway 30. The adverb "actively" means that the sorting means are able to provide momentum to the non-aligned preforms 12N to push them quickly toward the first angular sector 20A.

Figure 14:
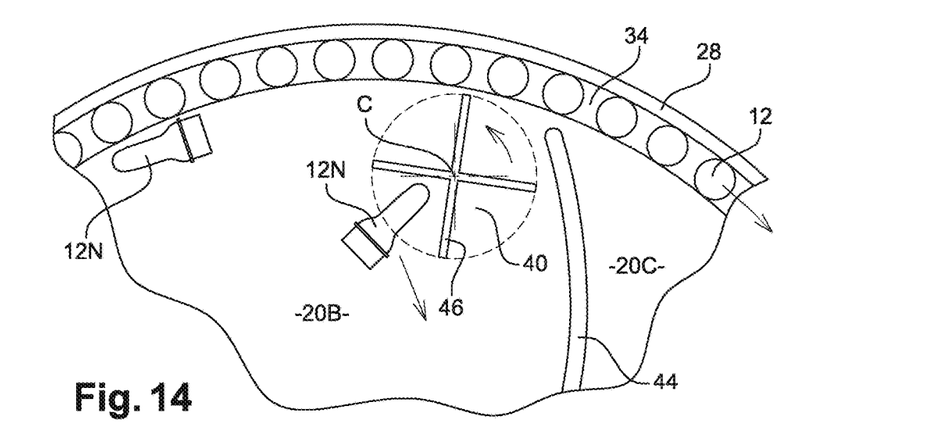
FIG. 14 is a top view that shows a zone of the centrifuge bowl of FIG. 1 that is located astride the righting sector and a sorting sector and that comprises a primary separator wheel in the process of separating out a poorly-aligned preform.

As shown in more detail in FIG. 14, first sorting means are thus formed by a first wheel 40 with pallets 46 called "main separator wheel," which is arranged rotating in the bowl 20, above the rotating platen 24 around a stationary axis "C." It is a matter here of a vertical axis "C." The space swept by the pallets 46 is thus cylindrical with a vertical axis "C." The main separator wheel 40 is arranged at an end that is upstream from the third angular sorting sector 20C.

This main separator wheel 40 makes it possible to separate the non-aligned preforms 12N that are always lying on the rotating platen 24 and are supported radially against the necks 16 of the correctly-aligned preforms 12. These non-aligned preforms 12N thus have at least one part that projects radially toward the center of the rotating platen 24 relative to the necks 16 of the correctly-aligned preforms 12.

Figure 15:
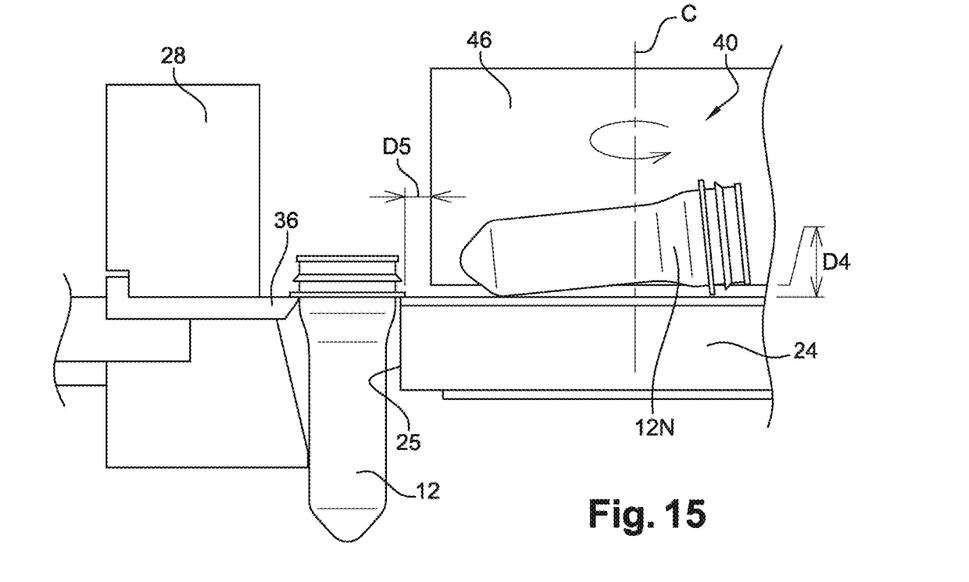
FIG. 15 is a radial cutaway view of the bowl that passes through the axis of rotation of the primary separator wheel that represents the primary separator wheel of FIG. 14.

The space swept by the pallets 46 excludes the passage of the necks 16 of the correctly-aligned preforms 12, with said passage extending above the gap 34. Moreover, each pallet 46 sweeps a space that is located above the rotating platen 24 at a vertical distance "D4" that is smaller than the minimum diameter "D3" of a preform 12 and at a radial distance "D5" from the edge 25 of the rotating platen 24 that is smaller than the minimum diameter "D3" of a preform 12. This makes it possible to eject the preforms 12N that are incorrectly aligned overall in the direction of the center of the rotating platen 24, as is shown in FIG. 15. For this purpose, the main separator wheel 40 rotates in the opposite direction relative to the rotating platen 24.

The sorting means also comprise a stationary deflector 44, which is arranged above the rotating platen 24 at a vertical distance that is smaller than that of the minimum diameter "D3" of the bodies 14 of the preforms 12, to guide the preforms 12N that are ejected by the main separator wheel 40 in the direction of the first angular sector 20A. Said non-aligned preforms 12N are guided by the deflector 44 until they are downstream from the exit passage 32 in the direction of rotation of the rotating platen 24. This makes it possible to prevent the non-aligned preforms 12N from being "blocked" in this third angular sorting sector 20C.

As is shown in FIG. 3, the deflector 44 thus extends from the outer edge 25 of the rotating platen 24, immediately downstream from the main separator wheel 40. It comes in the form of a spiral arm oriented toward the center of the rotating platen 24, downstream from the exit passage 32. An interval is reserved radially between the downstream end of the deflector 44 and the spillway 30 to make possible the return of the preforms 12N ejected by the main separator wheel 40 toward the first angular aligning sector 20A.

The deflector 44 ensures that in the space delimited between the downstream face of the deflector 44 and the railing 28, no incorrectly-aligned preform 12N is laid on the rotating platen 24.

The sorting means also comprise a second wheel 42 with pallets 46, a so-called secondary separator wheel 42, which is interposed between the deflector 44 and the exit passage 32 in the direction of rotation of the rotating platen 24. In the embodiment shown in FIG. 16, the secondary separator wheel 42 is more particularly arranged directly upstream from the exit passage 32, in such a way that the ejected preforms 12N are thrown off directly against the portion 28A for receiving the railing 28 without running the risk of reaching the exit passage 32.

Figure 16:
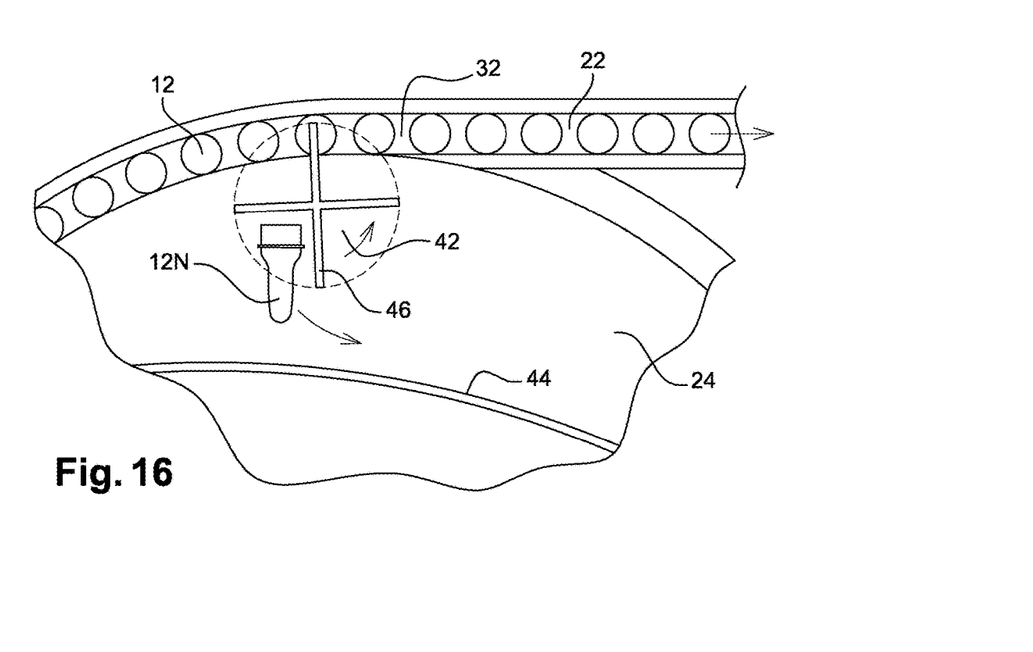
FIG. 16 is a top view that shows a portion downstream from the sorting sector of the centrifuge bowl of FIG. 1 and that comprises a secondary separator wheel in the process of separating out a poorly-aligned preform.

This second pallet wheel 42 is intended to eject the nested preforms 12N that travel with the correctly-aligned preforms 12 or else preforms 12N that rest on the necks 16 of the correctly-aligned preforms 12.

The secondary separator wheel 42 rotates here around a vertical axis "E." The space that is swept by the pallets 16 is thus cylindrical with axis "E."

Each pallet 46 sweeps a space that extends vertically above and near the neck of the correctly-aligned preforms, at a distance "D6" that is smaller than the minimum diameter of a preform 12N or at the height of the neck of said preform 12N.

Figure 17:
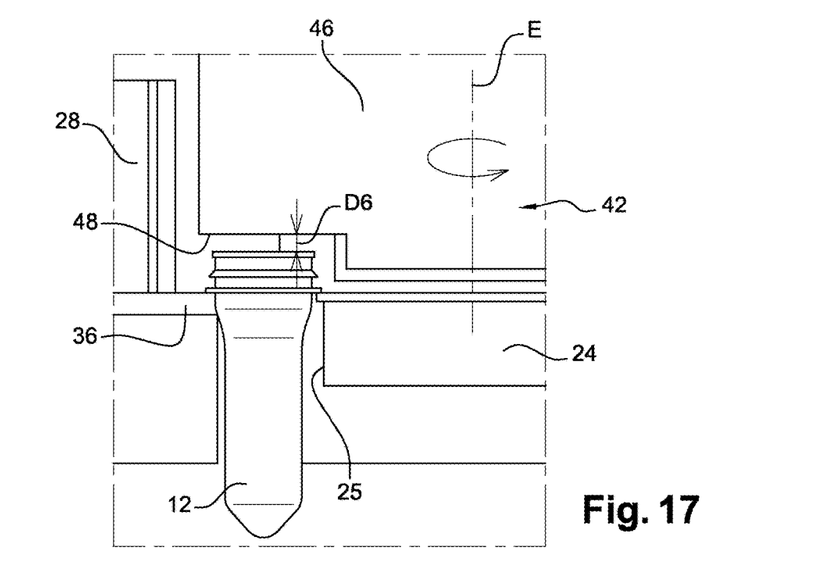
FIG. 17 is a radial cutaway view of the bowl that passes through the axis of rotation of the secondary separator wheel that represents the secondary separator wheel of FIG. 16.

Each pallet 46 has at its free end a cutaway 48 that corresponds to the size of a neck 16 of a preform 12 that is aligned correctly, as is illustrated in FIG. 17. This makes it possible not only to eject the nested preforms but also to ensure that these preforms will be correctly ejected without the possibility of going below the pallets 46.

As shown in the figures, the conveyor 22 is connected tangentially to the platen in the continuity of the exit passage 32 of the righted preforms 12. The conveyor 22 comprises a horizontal slide that is formed by an outer rail that extends the rail 36 of the railing 28, and a parallel inner rail that tangentially extends the outer edge 25 of the rotating platen 24. The rails are separated in such a way as to support a righted preform 12 by its support face 18, in this case by its collar. This arrangement makes it possible to evacuate the righted preforms 12 in a row without ever ceasing to guide them.

The conveyor 22 can also comprise a blower device (not shown) that makes it possible to move the righted preforms 12. For this purpose, the blower device comprises several vents that blow air toward the preforms 12 to push them downstream.

As a variant, the conveyor can be equipped with any other known means for moving aligned and righted preforms.

The constant guiding of the preforms in all of the steps of the method and during the transition between each of the steps makes it possible to ensure that the preforms 12 will be moved in a stable manner. This makes it possible in particular to rotate the rotating platen 24 at high speed to increase the flow rate of the preforms 12 without running the risk of putting correctly-aligned preforms 12 out of alignment.

In addition, the preforms are not pushed by indexing elements. As a result, the preforms 12 move without running the risk of jamming or sticking.

The device according to the invention is able to be adapted easily to various models of preforms. All that actually has to be done is to replace railing segments 28 so as to adapt the width of the gap 34 to the size of the body 14 and the support face 18 of each model, as well as to replace the associated treads 38. Such segments are easy to manufacture and quick to change.

The invention claimed is:

1. A method for aligning in a row and righting preforms (12), including preforms made of thermoplastic material to be shaped into final containers by a forming station, with the method being applied to axisymmetrical preforms (12) having annular support faces (18) and bodies (14) with a diameter that is smaller than the diameter of said annular support faces (18), the method comprising:
   a first step for discharging the preforms (12) in bulk onto a rotating horizontal platen (24);
   a second step for aligning the preforms (12) against a stationary peripheral railing (28) by centrifugal force that is produced by the rotation of the rotating horizontal platen (24), with the preforms (12) being driven in movement by the rotating horizontal platen (24) along said stationary peripheral railing (28) against which they are held by the centrifugal force, with each preform (12) that is aligned against the stationary peripheral railing (28) having a main axis (A) that is oriented essentially horizontally; and
   a third step for successive righting of the preforms (12) that are aligned by tilting the bodies (14) of the preforms under the annular support faces (18) until the main axis (A) of the preforms is vertical, with each preform (12) being supported by the annular support face (18) between two opposite support points,
   wherein during the second aligning step, the main axis (A) of the preforms (12) is oriented essentially tangentially to their direction of movement until the preforms are righted.

2. The method according to claim 1, wherein the righted preforms (12) are driven in rotation around their main axis (A) by friction against an outer edge (25) of the rotating horizontal platen (24), with the preforms (12) thus being moved around a bowl (20) in the direction of rotation of the rotating horizontal platen (24) by rolling against the stationary peripheral railing (28).

3. A device (10) for aligning in a row and righting preforms (12), including axisymmetrical preforms (12) having annular support faces (18) and bodies (14) with a diameter that is smaller than a diameter of said annular support faces (18), the device (10) comprising:
   a centrifuge bowl (20) having a first established angular sector (20A) that includes a first portion (28A), the centrifuge bowl (20) further comprising:
   a horizontal circular platen (24) that rotates around a vertical axis, the horizontal circular platen (24) having an outer edge (25);
   a stationary peripheral railing (28) received in the first portion (28A) and radially delimiting the centrifuge bowl, the stationary peripheral railing (28) positioned with respect to the horizontal circular platen (24) to hold the preforms (12) thrown off by centrifugal force produced by rotation of the horizontal circular platen (24);
   a preform spillway (30) positioned with respect to the horizontal circular platen (24) to discharge the preforms (12) in bulk onto the horizontal circular platen (24) in a direction of the first portion (28A) that receives the stationary peripheral railing (28); and
   a righting arrangement structured for righting said preforms, the first established angular sector (20A) extending to the righting arrangement,
   wherein, on the first established angular sector (20A) of the centrifuge bowl (20) that includes the first portion (28A) and extends to the righting arrangement, the stationary peripheral railing (28) is placed close to the horizontal circular platen (24) in such a way that an operational play distance is reserved between the stationary peripheral railing (28) and the horizontal circular platen (24), the operational play distance being less than a minimum diameter of the bodies (14) of the preforms (12), whereby the stationary peripheral railing (28) can hold the bodies (14) of the preforms (12) on the horizontal circular platen (24), and
   wherein said device is operative for
   a first step of discharging the preforms (12) in bulk onto the horizontal circular platen (24) during rotation of the horizontal circular platen (24),
   a second step of aligning the preforms (12) against the stationary peripheral railing (28) by centrifugal force that is produced by the rotation of the rotating horizontal platen (24), with the preforms (12) being driven in movement by the rotation of the horizontal circular platen (24) along said stationary peripheral railing (28) against which they are held by the centrifugal force, with each preform (12) that is aligned against the stationary peripheral railing (28) having a main axis (A) that is oriented essentially horizontally, with the main axis (A) of the preforms (12) oriented essentially tangentially to their direction of movement until the preforms are righted, and a third step of successive righting of the preforms (12) that are aligned by tilting the bodies (14) of the preforms under the annular support faces (18) until the main axis (A) of the preforms is vertical, with each preform (12) being supported by the annular support face (18) between two opposite support points.

4. The device according to claim 3, wherein at least on a periphery of the first established angular sector (20A) of the centrifuge bowl (20), the stationary peripheral railing (28) extends vertically above the horizontal circular platen (24).

5. The device according to claim 4, wherein, the centrifuge bowl includes a second angular sector (20B) arranged downstream from the first established angular sector (20A) in a direction of rotation of the horizontal circular platen (24), on that the second angular sector (20B) of the centrifuge bowl (20), the righting arrangement comprises a peripheral gap (34) formed by radial separation of the stationary peripheral railing (28) relative to the outer edge (25) of the horizontal circular platen (24), with said peripheral gap having a radial width whose value is between the diameter of the bodies (14) of the preforms (12) and the diameter of the annular support faces (18) the radial width of said peripheral gap (24) allowing the bodies (14) of the preforms (12) to tilt under the area of the horizontal circular platen (24) through said peripheral gap (34), with the annular support faces (18) being supported jointly by the horizontal circular platen (24) and by the stationary peripheral railing (28).

6. The device according to claim 5, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

7. The device according to claim 5, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

8. The device according to claim 3, wherein, the centrifuge bowl includes a second angular sector (20B) arranged downstream from the first established angular sector (20A) in a direction of rotation of the horizontal circular platen (24), on that the second angular sector (20B) of the centrifuge bowl (20), the righting arrangement comprises a peripheral gap (34) formed by radial separation of the stationary peripheral railing (28) relative to the outer edge (25) of the horizontal circular platen (24), with said peripheral gap having a radial width whose value is between the diameter of the bodies (14) of the preforms (12) and the diameter of the annular support faces (18) the radial width of said peripheral gap (24) allowing the bodies (14) of the preforms (12) to tilt under the area of the horizontal circular platen (24) through said peripheral gap (34), with the annular support faces (18) being supported jointly by the horizontal circular platen (24) and by the stationary peripheral railing (28).

9. The device according to claim 8, wherein the stationary peripheral railing (28) includes a support rail (36) that supports the annular support faces (18) of the preforms and that extends at least on the second angular sector (20B) of the centrifuge bowl (20), with the support rail (36) extending in a same area as the horizontal circular platen (24) to delimit the peripheral gap (34) on outside of the outer edge (25) of the horizontal circular platen (24).

10. The device according to claim 9, wherein at least one of the outer edge (25) of the horizontal circular platen (24) and the stationary peripheral railing (28) comprise a tread (38) having a friction coefficient that allows the preforms (12) to roll against the tread (38) without sliding.

11. The device according to claim 10, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

12. The device according to claim 9, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

13. The device according to claim 8, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

14. The device according to claim 13, wherein the conveyor (22) is formed by a horizontal slide formed by an outer rail that extends the support rail (36) of the stationary peripheral railing (28) and a parallel inner rail that extends tangentially the outer edge (25) of the horizontal circular platen (24), with the outer and inner rails being separated in such a way as to support the preforms (12) that are righted by the preforms' support face (18).

15. The device according to claim 14, further comprising a blower device, wherein the righted preforms (12) that are transferred to the conveyor (22) are moved by a blower device.

16. A device (10) for aligning in a row and righting preforms (12), including axisymmetrical preforms (12) having annular support faces (18) and bodies (14) with a diameter that is smaller than a diameter of said annular support faces (18), each preform having a main axis (A), the device (10) comprising:

a centrifuge bowl (20) having a first established angular sector (20A) that includes a first portion (28A), the centrifuge bowl (20) further comprising:

a horizontal circular platen (24) that rotates around a vertical axis, the horizontal circular platen (24) having an outer edge (25);

a stationary peripheral railing (28) received in the first portion (28A) and radially delimiting the centrifuge bowl, the stationary peripheral railing (28) positioned with respect to the horizontal circular platen (24) to hold the preforms (12) thrown off by centrifugal force produced by rotation of the horizontal circular platen (24);

a preform spillway (30) positioned with respect to the horizontal circular platen (24) to discharge the preforms (12) in bulk onto the horizontal circular platen (24) in a direction of the first portion (28A) that receives the stationary peripheral railing (28); and a righting arrangement structured for righting said preforms, the first established angular sector extending to the righting arrangement, wherein the righted preforms (12) are driven in rotation around the main axis (A) by friction against the outer edge (25) of the horizontal circular platen (24), with the preforms (12) thus being moved around the bowl (20) in the direction of rotation of the horizontal circular platen (24) by rolling against the stationary peripheral railing (28), and wherein, on the first established angular sector (20A) of the centrifuge bowl (20) that includes the first portion (28A) and extends to the righting arrangement, the stationary peripheral railing (28) is placed close to the horizontal circular platen (24) in such a way that an operational play distance is reserved between the stationary peripheral railing (28) and the horizontal circular platen (24), the operational play distance being less than a minimum diameter of the bodies (14) of the preforms (12), whereby the stationary peripheral railing (28) can hold the bodies (14) of the preforms (12) on the horizontal circular platen (24), and wherein said device is operative for a first step of discharging the preforms (12) in bulk onto the horizontal circular platen (24) during rotation of the horizontal circular platen (24), a second step of aligning the preforms (12) against the stationary peripheral railing (28) by centrifugal force that is produced by the rotation of the rotating horizontal platen (24), with the preforms (12) being driven in movement by the rotation of the horizontal circular platen (24) along said stationary peripheral railing (28) against which they are held by the centrifugal force, with each preform (12) that is aligned against the stationary peripheral railing (28) having a main axis (A) that is oriented essentially horizontally, with the main axis (A) of the preforms (12) oriented essentially tangentially to their direction of movement until the preforms are righted, and a third step of successive righting of the preforms (12) that are aligned by tilting the bodies (14) of the preforms under the annular support faces (18) until the main axis (A) of the preforms is vertical, with each preform (12) being supported by the annular support face (18) between two opposite support points.

17. The device according to claim 16, wherein, the centrifuge bowl includes a second angular sector (20B) arranged downstream from the first established angular sector (20A) in a direction of rotation of the horizontal circular platen (24), on that the second angular sector (20B) of the centrifuge bowl (20), the righting arrangement comprises a peripheral gap (34) formed by radial separation of the stationary peripheral railing (28) relative to the outer edge (25) of the horizontal circular platen (24), with said peripheral gap having a radial width whose value is between the diameter of the bodies (14) of the preforms (12) and the diameter of the annular support faces (18) the radial width of said peripheral gap (24) allowing the bodies (14) of the preforms (12) to tilt under the area of the horizontal circular platen (24) through said peripheral gap (34), with the annular support faces (18) being supported jointly by the horizontal circular platen (24) and by the stationary peripheral railing (28).

18. The device according to claim 17, wherein, the stationary peripheral railing (28) includes an exit passage (32) located downstream from the second angular sector (20B), the exit passage (32) for exiting of righted preforms (12), and further comprising a conveyor (22) that is connected tangentially to the horizontal circular platen (24) at the exit passage (32).

* * * * *